(12) United States Patent
Sasaki et al.

(10) Patent No.: US 12,498,396 B2
(45) Date of Patent: Dec. 16, 2025

(54) PROBE UNIT

(71) Applicant: NHK Spring Co., Ltd., Yokohama (JP)

(72) Inventors: Futa Sasaki, Kanagawa (JP); Hajime Arai, Kanagawa (JP); Kazuya Soma, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 185 days.

(21) Appl. No.: 18/271,485

(22) PCT Filed: Sep. 10, 2021

(86) PCT No.: PCT/JP2021/033413
§ 371 (c)(1),
(2) Date: Jul. 10, 2023

(87) PCT Pub. No.: WO2022/158032
PCT Pub. Date: Jul. 28, 2022

(65) Prior Publication Data
US 2024/0053380 A1    Feb. 15, 2024

(30) Foreign Application Priority Data
Jan. 19, 2021  (JP) .................. 2021-006704

(51) Int. Cl.
*G01R 1/067*    (2006.01)
*G01R 1/073*    (2006.01)

(52) U.S. Cl.
CPC ................. *G01R 1/06722* (2013.01)

(58) Field of Classification Search
CPC ............... G01R 1/06722; G01R 1/073; G01R 1/07314; G01R 1/067
See application file for complete search history.

(56) References Cited

U.S. PATENT DOCUMENTS

| 7,021,944 B2 | 4/2006 | Adachi et al. |
| 2004/0183556 A1* | 9/2004 | Wada ................. G01R 1/07314 29/842 |
| 2005/0095734 A1* | 5/2005 | Hasebe .................... G01R 3/00 438/107 |

(Continued)

FOREIGN PATENT DOCUMENTS

| JP | 2002-148306 A | 5/2002 |
| JP | 2003-123923 A | 4/2003 |

(Continued)

*Primary Examiner* — Raul J Rios Russo
*Assistant Examiner* — Temilade S Rhodes-Vivour
(74) *Attorney, Agent, or Firm* — Troutman Pepper Locke LLP; James E. Armstrong, IV; Joshua L. Jones

(57) ABSTRACT

A probe unit includes: a contact probe that comes into contact with, at both ends of a longitudinal length of the contact probe, each of electrodes that are contact targets; and a probe holder including a main body portion configured to hold the contact probe, the main body portion being insulating. The main body portion includes, formed therein: a holder hole configured to hold the contact probe inserted in the holder hole; and a counterbore portion drilled in at least part of an area around the holder hole, the area being on one of surfaces of the main body portion, the surfaces being near one end and another end of the contact probe, the counterbore portion having an inner wall surface that forms a hollow space and that is insulating.

11 Claims, 15 Drawing Sheets

(56) References Cited

U.S. PATENT DOCUMENTS

| | | | | |
|---|---|---|---|---|
| 2007/0145990 A1* | 6/2007 | Fukushima | ............ | G01R 1/045 324/755.05 |
| 2010/0123476 A1* | 5/2010 | Kazama | ............. | G01R 1/06722 324/755.01 |
| 2010/0188112 A1* | 7/2010 | Yoshida | ................. | G01R 1/045 324/755.01 |
| 2022/0011345 A1 | 1/2022 | Inuma et al. | | |

FOREIGN PATENT DOCUMENTS

| | | |
|---|---|---|
| JP | 2004-146103 A | 5/2004 |
| JP | 2004-340867 A | 12/2004 |
| JP | 2013-195282 A | 9/2013 |
| JP | 2018-179671 A | 11/2018 |
| JP | 2020-020660 A | 2/2020 |
| JP | 2020-153723 A | 9/2020 |
| WO | 2010/117080 A1 | 10/2010 |
| WO | 2020/111076 A1 | 6/2020 |

* cited by examiner

PROBE UNIT

FIELD

The present invention relates to probe units.

BACKGROUND

In performing a continuity test or an operation characteristic test on a test target, such as a semiconductor integrated circuit or a liquid crystal panel, a probe unit including contact probes and a probe holder accommodating these plural contact probes has been used conventionally, the contact probes being for electric connection between the test target and a signal processing device that outputs a test signal.

In general, in a case where a high frequency electric signal is input or output, signal loss called insertion loss is generated. For high precision and high speed operation of a probe unit, reducing this insertion loss in a frequency domain that is used is important. For example, techniques for characteristic impedance matching are disclosed in Patent Literature 1 to Patent Literature 3. According to Patent Literature 1, characteristic impedance is adjusted by provision of air layers around contact probes. According to Patent Literature 2, fluctuation of characteristic impedance of the whole probes is minimized by provision of insulating rings to the contact probes. According to Patent Literature 3, characteristic impedance is adjusted by provision of insulating members having porosity, around contact probes.

Furthermore, a technique for minimizing power feeding loss at high frequency has been disclosed and in this technique, through holes are provided around contact probes and the through holes are connected to the earth (for example, see Patent Literature 4).

CITATION LIST

Patent Literature

Patent Literature 1: Japanese Unexamined Patent Application, Publication No. 2020-020660
Patent Literature 2: Japanese Unexamined Patent Application, Publication No. 2020-153723
Patent Literature 3: Japanese Unexamined Patent Application, Publication No. 2018-179671
Patent Literature 4: Japanese Unexamined Patent Application, Publication No. 2004-146103

SUMMARY

Technical Problem

However, the techniques according to Patent Literature 1 to Patent Literature 3 are focused on characteristic impedance matching and not on damping itself of high frequency signals. Therefore, even if reflection loss is able to be reduced by characteristic impedance matching, damping from insertion loss may be increased. Furthermore, even if through holes are adopted like in Patent Literature 4, the through holes have large mismatches and have not been able to reduce damping sufficiently.

The present invention has been made in view of the above and an object thereof is to provide a probe unit that enables minimization of damping of high frequency signals.

Solution to Problem

To solve the above-described problem and achieve the object, a probe unit according to the present invention includes: a contact probe that comes into contact with, at both ends of a longitudinal length of the contact probe, each of electrodes that are contact targets; and a probe holder including a main body portion configured to hold the contact probe, the main body portion being insulating, wherein the main body portion includes, formed therein: a holder hole configured to hold the contact probe inserted in the holder hole; and a counterbore portion drilled in at least part of an area around the holder hole, the area being on one of surfaces of the main body portion, the surfaces being near one end and another end of the contact probe, the counterbore portion having an inner wall surface that forms a hollow space and that is insulating.

Moreover, in the probe unit according to the present invention, one or more counterbore portions that are same as the counterbore portion are provided around the holder hole for the holder hole.

Moreover, in the probe unit according to the present invention, the main body portion is a single layer.

Moreover, in the probe unit according to the present invention, the main body portion includes plural members layered over one another and at least one of the plural members is a single layer formed of a different insulating material.

Moreover, in the probe unit according to the present invention, the main body portion includes, layered over one another: a first member formed of an insulating material; a second member formed of same insulating material as the first member; and a third member provided between the first member and the second member and formed of an insulating material different from that of the first member and the second member.

Moreover, in the probe unit according to the present invention, the counterbore portion includes: a first counterbore portion provided in the first member, penetrating the first member, and having a bottom surface at a surface of the third member; and a second counterbore portion provided in the second member, penetrating the second member, and having a bottom surface at a surface of the third member.

Moreover, in the probe unit according to the present invention, the main body portion further includes a fourth member provided on one side of the second member, the one side being opposite to a side where the third member is, and the holder hole includes: a first holder hole penetrating the first to third members and forming a stepped space having a narrower end portion near the first member; and a second holder hole penetrating the fourth member and being a through hole having an opening with a diameter smaller than a diameter of the first holder hole.

Moreover, in the probe unit according to the present invention, the counterbore portion has a bottomed hole shape.

Moreover, in the probe unit according to the present invention, the counterbore portion is a through hole penetrating the main body portion.

Moreover, in the probe unit according to the present invention, the contact probe includes: a first plunger that forms a bottomed hollow space and comes into contact with one of the contact targets; a second plunger that forms a bottomed hollow space and comes into contact with the other one of the contact targets; and a coil spring that biases the first and second plungers, the hollow spaces of the first and second plungers are coupled to each other and the first and second plungers are thereby connected with each other, and the coil spring is positioned in a hollow space formed by the first and second plunger.

Moreover, in the probe unit according to the present invention, the probe holder holds a first contact probe to be connected to an electrode for a signal and a second contact probe to be connected to an electrode for grounding, and in arrangement of the contact probe in the probe holder, at least one second contact probe that is same as the second contact probe is arranged around the first contact probe.

Advantageous Effects of Invention

The present invention has an effect of enabling minimization of damping of high frequency signals.

DESCRIPTION OF EMBODIMENTS

Modes for implementing the present invention will hereinafter be described in detail, together with the drawings. The present invention is not limited by the following embodiments. Furthermore, the drawings referred to in the following description just schematically illustrate shapes, sizes, and positional relations to enable the present invention to be understood, and the present invention is therefore not limited only to the shapes, sizes, and positional relations exemplified by the drawings.

First Embodiment

Figure 1:
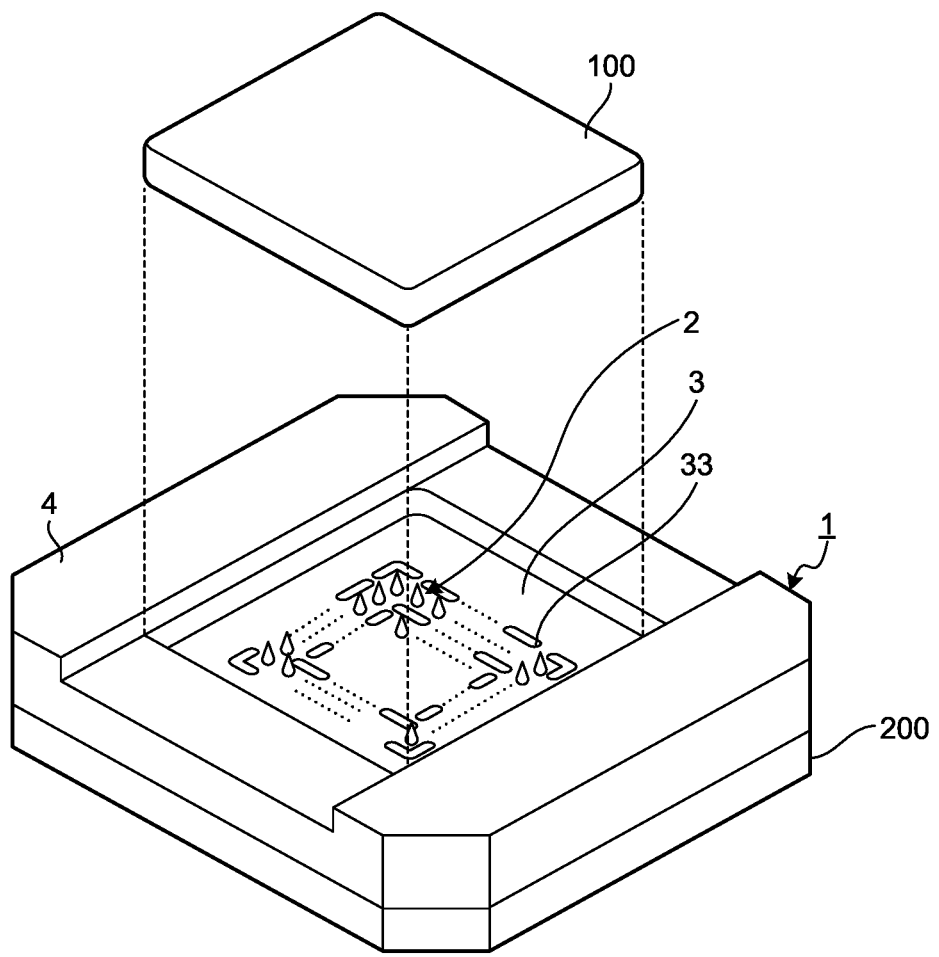
FIG. 1 is a perspective view illustrating a configuration of a probe unit according to a first embodiment of the present invention.

FIG. 1 is a perspective view illustrating a configuration of a probe unit according to a first embodiment of the present invention. A probe unit 1 illustrated in FIG. 1 is a device used in testing electrical properties of a semiconductor integrated circuit 100 that is a test target, and is a device that electrically connects between the semiconductor integrated circuit 100 and a circuit board 200 that outputs a test signal to the semiconductor integrated circuit 100.

The probe unit 1 has: electrically conductive contact probes 2 (hereinafter, simply referred to as "probes 2") that come into contact, at both ends of a longitudinal length of the probes 2, with electrodes of the semiconductor integrated circuit 100 and circuit board 200 that are two contacted bodies different from each other; a probe holder 3 that accommodates and holds these plural probes 2 according to a predetermined pattern; and a holder member 4 that is provided around the probe holder 3 and minimizes displacement of the semiconductor integrated circuit 100 that comes into contact with the plural probes 2 upon testing.

Figure 2:
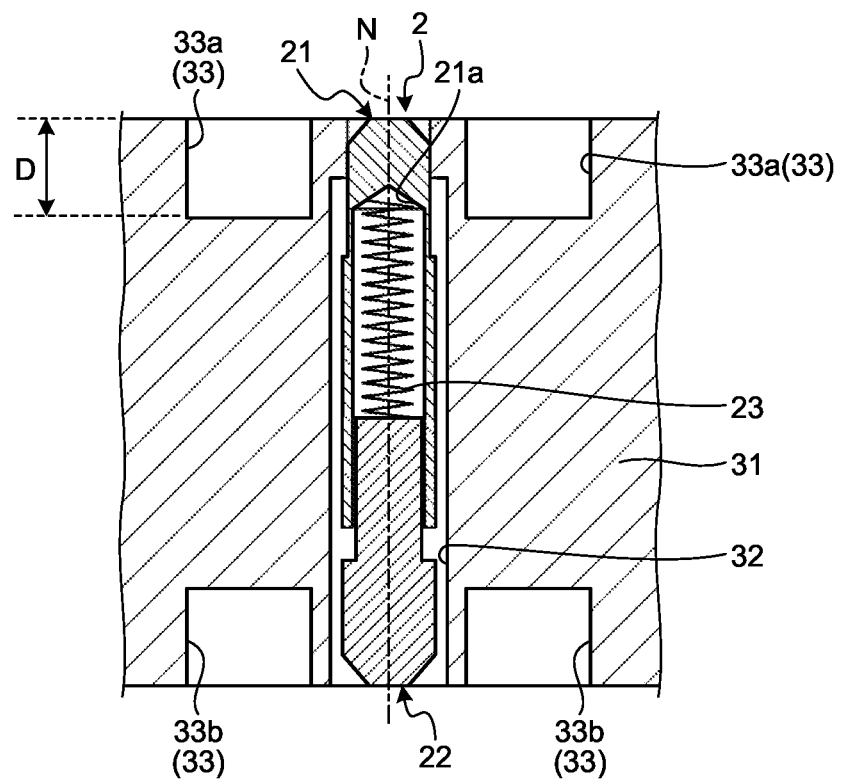
FIG. 2 is a sectional view illustrating a configuration of main parts of the probe unit according to the first embodiment of the present invention.

FIG. 2 is a sectional view illustrating a configuration of main parts of the probe unit according to the first embodiment of the present invention. A probe 2 illustrated in FIG. 2 includes: a first plunger 21 that is formed using an electrically conducting material and comes into contact with an electrode of the semiconductor integrated circuit 100 upon testing of the semiconductor integrated circuit 100; a second plunger 22 that comes into contact with an electrode of the circuit board 200 including a testing circuit; and a coil spring 23 that is provided between the first plunger 21 and the second plunger 22 and expandably and contractably couples the two first plunger 21 and second plunger 22 together. The first plunger 21 and second plunger 22 and the coil spring 23 that form the probe 2 share the same axis. The probe 2 mitigates impact on the electrode of the semiconductor integrated circuit 100 and applies a load to the semiconductor integrated circuit 100 and the circuit board 200 by expanding and contracting in an axial direction when the semiconductor integrated circuit 100 is brought into contact with the probe 2. FIG. 2 illustrates a state where the probe 2 has contracted the most, but in a case where no load has been applied to the probe 2 from a contacted body, the probe 2 expands due to biasing force of the coil spring 23 and part of the first plunger 21 and/or second plunger 22 protrudes from the probe holder 3. The coil spring 23 may be configured to be coarsely wounded by winding of a wire at predetermined intervals in a natural state where no load other than gravitational force is being applied, or may be configured to have a tightly wound portion formed by winding of part of a wire tightly.

The first plunger 21 has a hollow space 21a having a bottom. Part of the second plunger 22 is inserted into the hollow space 21a to be coupled. The coil spring 23 is positioned in the hollow space 21a. That is, the coil spring 23 is positioned in an internal space formed by the first plunger 21 and second plunger 22.

The probe holder 3 includes a main body portion 31 formed using an insulating material, such as resin, machinable ceramic, or silicon. The main body portion 31 is a single layer. The main body portion 31 has, formed therein: holder holes 32 for accommodating the plural probes 2; and counterbore portions 33 provided around the holder holes 32 and each having a groove shape. Positions at which the holder holes 32 are formed are determined according to a wiring pattern of the semiconductor integrated circuit 100. The holder holes 32 and the probes 2 respectively have stepped portions that catch each other to thereby prevent the holder holes 32 and the probes 2 from coming off each other. For example, the stepped portions formed in the second plungers 22 and the stepped portions formed in the holder holes 32 catch each other to prevent them from coming off each other. An axis N illustrated in FIG. 2 is a central axis of the holder hole 32. FIG. 2 illustrates an example in which the central axis (axis N) of the holder hole 32 coincides with a longitudinal axis of the probe 2.

Figure 3:
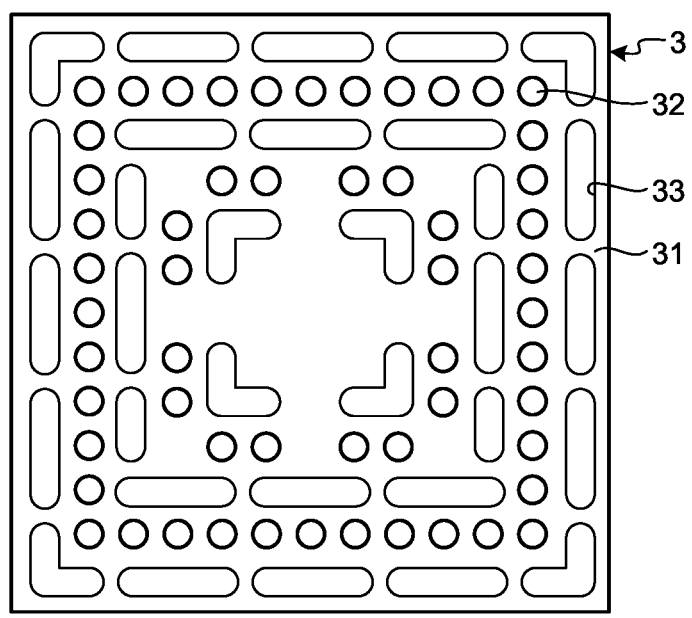
FIG. 3 is a plan view illustrating a configuration of a probe holder included in the probe unit according to the first embodiment of the present invention.

FIG. 3 is a plan view illustrating a configuration of a probe holder included in the probe unit according to the first embodiment of the present invention. The holder holes 32 form a loop along the perimeter of the probe holder 3. The counterbore portions 33 each have: a counterbore portion 33a forming a bottomed hollow space drilled in part of a surface of the main body portion 31, the surface being where one of openings of a holder hole 32 is formed; and a counterbore portion 33b forming a bottomed hollow space drilled in part of a surface of the main body portion 31, the surface being where the other one of the openings of the holder hole 32 is formed. The counterbore portions 33a and the counterbore portions 33b are respectively provided around the holder holes 32.

Inner wall surfaces forming the hollow spaces in the counterbore portions 33 are insulating. Each of the counterbore portions 33 does not have an electrically conductive film formed therein like a through hole, for example, and has a bottomed hole shape without electric conductivity.

When the semiconductor integrated circuit 100 is tested, the coil spring 23 is brought into a state of being compressed along a longitudinal direction thereof by a contact load from the semiconductor integrated circuit 100 (see, for example, FIG. 2). Compressing the coil spring 23 reduces the pitch of the wire. A test signal supplied from the circuit board 200 to the semiconductor integrated circuit 100 upon the testing reaches the electrode of the semiconductor integrated circuit 100 via the second plunger 22 and first plunger 21 of the probe 2 from the electrode of the circuit board 200. In this testing, the test signal may go through the coil spring 23.

Figure 4:
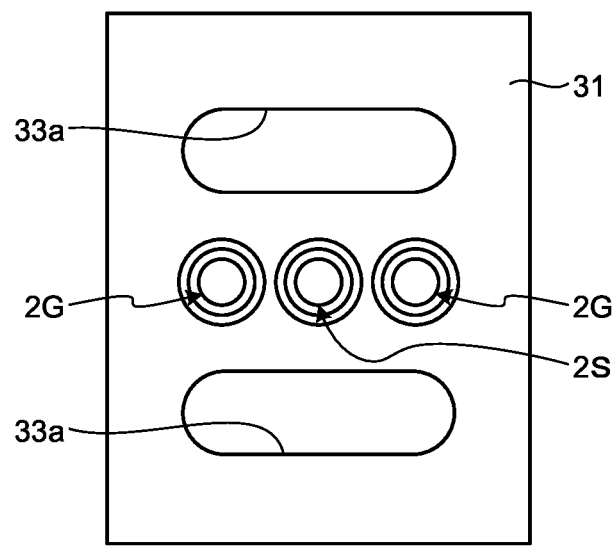
FIG. 4 is a plan view illustrating a configuration of main parts of the probe unit according to the first embodiment of the present invention.

FIG. 4 is a plan view illustrating a configuration of main parts of the probe unit according to the first embodiment of the present invention. FIG. 4 corresponds to a view from above the probe holder illustrated in FIG. 2. In an example considered herein, one of three probes 2 arranged adjacent to each other, the one being in the center, is brought into contact with an electrode for signal transmission, and the other probes 2 are connected to an electrode for grounding. In this example, the probe 2 connected to the electrode for the signal is referred to as a probe 2S and the probes 2 connected to the electrode for grounding are referred to as probes 2G. Spot facing portions 33 (only counterbore portions 33a are illustrated in FIG. 4) are formed around these probes 2S and 2G.

Figure 5:
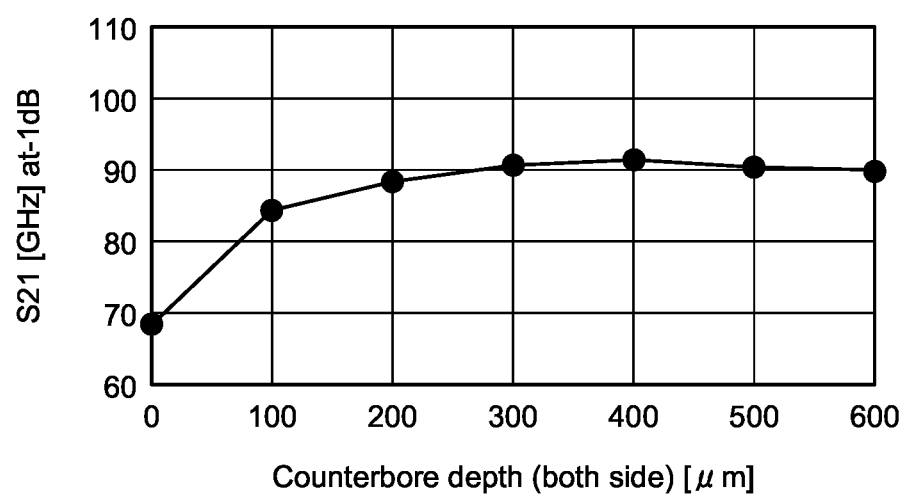
FIG. 5 is a diagram illustrating insertion loss (S21) in the probe unit according to the first embodiment of the present invention.

FIG. 5 is a diagram illustrating insertion loss (S21) in the probe unit according to the first embodiment of the present invention. For the arrangement of the probes 2 and counterbore portions 33a illustrated in FIG. 4, by changing depth (depth D illustrated in FIG. 2) of the counterbore portions 33a, an analysis of frequency at which S21 became −1 dB (insertion loss of +1 dB) was made. This analysis was conducted using Ansys HFSS manufactured by Ansys, Inc., with the pitch between the probes 2 being set to 0.4 mm and the thickness of the counterbore portions 33 in the main body portion 31 set to 1.75 mm, the thickness being in a depth direction. Publicly known software may be used for the analysis. Furthermore, the analysis was conducted by assuming that the counterbore portions 33a and 33b are formed in the counterbore portions 33 as illustrated in FIG. 2. In the analysis, depths of the counterbore portions 33a and 33b from the surfaces of the main body portion 31 are set the same.

As illustrated in FIG. 5, forming the counterbore portions 33a and 33b increases the frequency at which-1 dB is reached. The frequency in a case where the counterbore portions 33 are not provided (a depth of zero) is 68.5 GHz that is lower than those for configurations having the counterbore portions 33 formed therein. Furthermore, in FIG. 5, the frequency peaks when the counterbore depth of the counterbore portions 33a and 33b reaches 400 μm and decreases slightly as the counterbore depth increases further. The frequency in a case where the counterbore portions 33a and 33b become continuous with each other to be formed into through holes was 89.5 GHz.

In the above described first embodiment, providing the counterbore portions 33 around the probes 2 in the probe holder 3 enables reduction in insertion loss at higher frequency. The first embodiment enables minimization of damping of high frequency signals by formation of the counterbore portions 33.

The above described counterbore portions 33 are grooves with insulating inner walls and are different from through holes with electrically conductive inner walls. Such through holes are larger in characteristic impedance mismatch than the counterbore portions 33. Therefore, reflection is increased in through holes, and as a result, the band of a signal transmitted therethrough is narrowed.

Furthermore, the counterbore portions 33 in the above described first embodiment are able to serve as marks for positioning of the probes 2 for high frequency.

First Modified Example of First Embodiment

Figure 6:
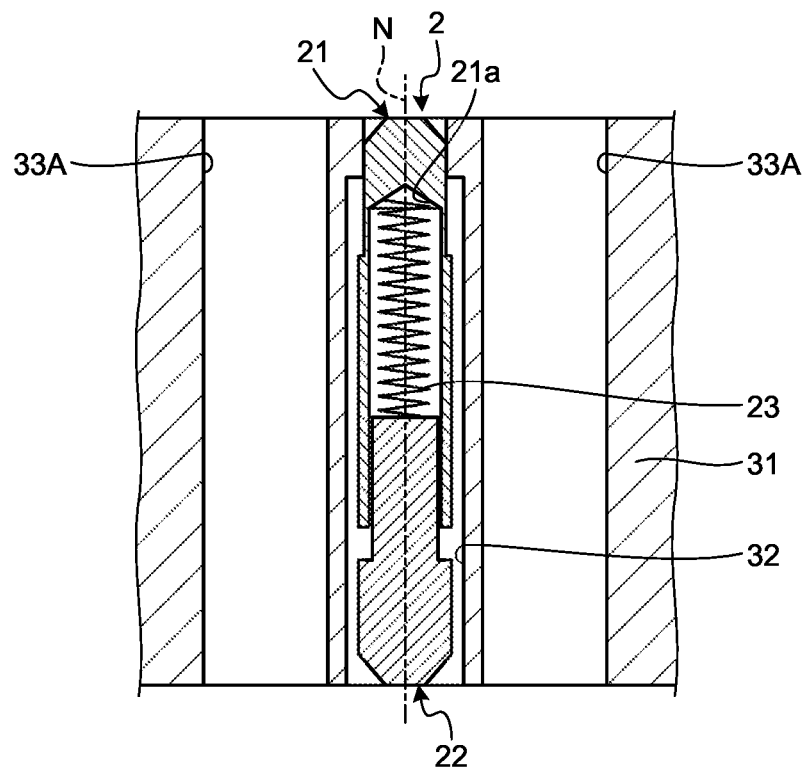
FIG. 6 is a sectional view illustrating a configuration of main parts of a probe unit according to a first modified example of the first embodiment of the present invention.

A first modified example the first embodiment will be described next by reference to FIG. 6. FIG. 6 is a sectional view illustrating a configuration of main parts of a probe unit according to the first modified example of the first embodiment of the present invention. In the above described first embodiment, the counterbore portions 33a and the counterbore portions 33b are formed independently of each other, but in this first modified example, counterbore portions 33A are each formed as a through hole penetrating a main body portion 31 by the counterbore portions 33a and the counterbore portion 33b being joined to each other, the counterbore portions 33a and the counterbore portions 33b opposing each other in a board thickness direction of the main body portion 31.

In the first modified example, similarly to the above described first embodiment, providing the counterbore portions 33A around probes 2 in a probe holder 3 enables reduction of insertion loss at higher frequency.

A GSG structure having the probe 2S for signals interposed between the probes 2G for grounding has been described as an example for the first embodiment but without being limited to this example, the probes 2 may be arranged to include at least one probe 2G around a probe 2S. Examples of a structure other than the GSG structure will be described hereinafter.

Second Modified Example of First Embodiment

Figure 7:
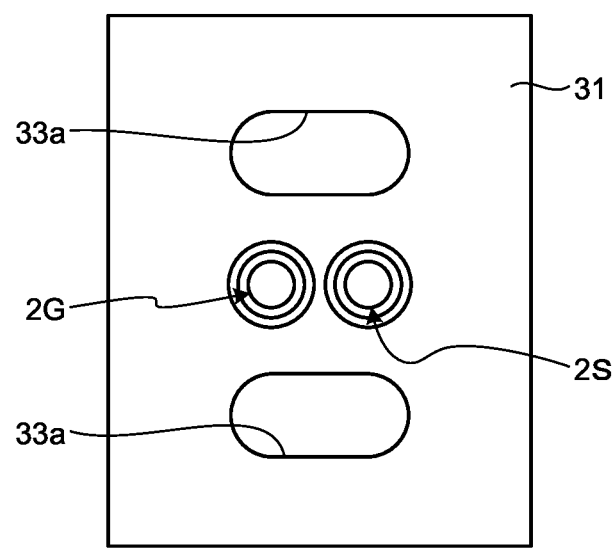
FIG. 7 is a plan view illustrating a configuration of main parts of a probe unit according to a second modified example of the first embodiment of the present invention.

A second modified example of the first embodiment will be described next by reference to FIG. 7. FIG. 7 is a plan view illustrating a configuration of main parts of a probe unit according to the second modified example of the first embodiment of the present invention. FIG. 7 corresponds to a view from above the probe holder illustrated in FIG. 2. In the second modified example, one of two probes 2 arranged adjacent to each other is a probe 2S for signal transmission and the other one of the two probes is a probe 2G for grounding. Counterbore portions 33 (only counterbore portions 33a are illustrated in FIG. 7) are formed around these probes 2S and 2G. For this GS structure also, providing the counterbore portions 33 around the probes 2 enables reduction in insertion loss at higher frequency.

Third Modified Example of First Embodiment

Figure 8:
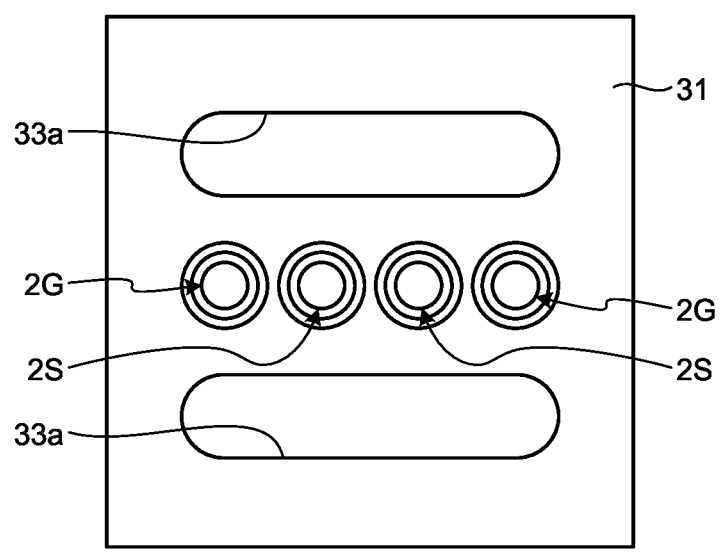
FIG. 8 is a plan view illustrating a configuration of main parts of a probe unit according to a third modified example of the first embodiment of the present invention.

A third modified example the first embodiment will be described next by reference to FIG. 8. FIG. 8 is a plan view illustrating a configuration of main parts of a probe unit according to the third modified example of the first embodiment of the present invention. FIG. 8 corresponds to a view from above the probe holder illustrated in FIG. 2. In this third modified example, two of four probes 2 arranged adjacent to each other are probes 2S for signal transmission, the two being in the center, and two of the four probes 2 are probes 2G for grounding, the latter two being on both sides of the probes 2S. Counterbore portions 33 (only counterbore portions 33a are illustrated in FIG. 8) are formed around these probes 2S and 2G. For this GSSG structure also, providing the counterbore portions 33 around the probes 2 enables reduction in insertion loss at higher frequency.

Second Embodiment

Figure 9:
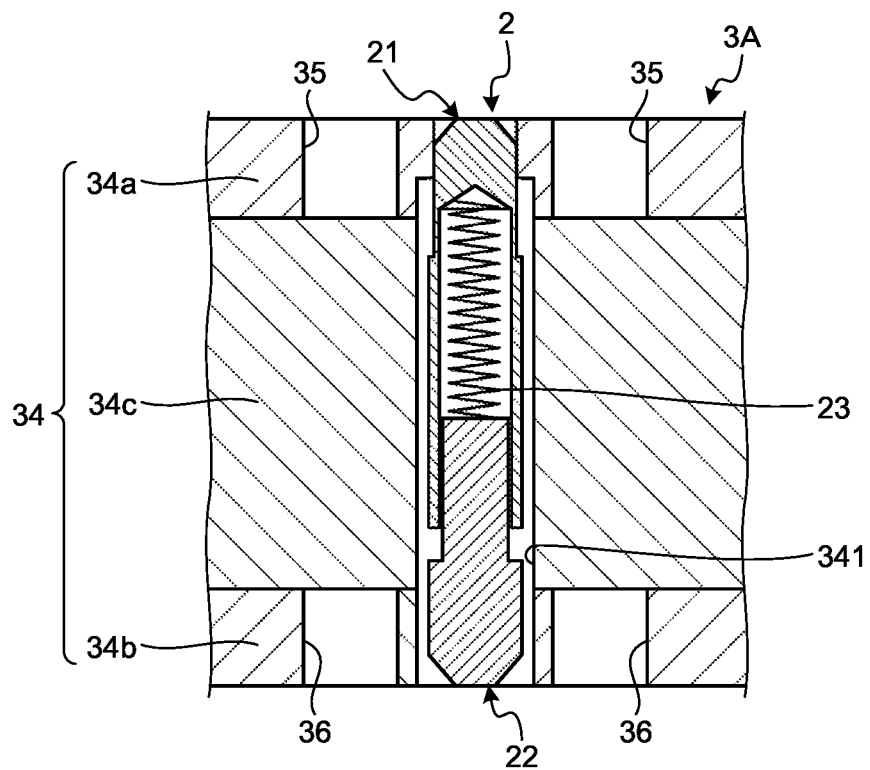
FIG. 9 is a sectional view illustrating a configuration of main parts of a probe unit according to a second embodiment of the present invention.

A second embodiment of the present invention will be described next. FIG. 9 is a sectional view illustrating a configuration of main parts of a probe unit according to the second embodiment of the present invention. The probe unit according to the second embodiment includes a probe holder 3A instead of the probe holder 3 of the probe unit 1 described above. Components other than the probe holder 3A are similar to those of the first embodiment and description thereof will thus be omitted.

The probe holder 3A includes a main body portion 34 formed using an insulating material, such as resin, machinable ceramic, or silicon. The main body portion 34 is a multilayer having plural members layered over one another, the plural members being formed using different insulating materials. The main body portion 34 has, layered over one another, a first member 34a positioned up in FIG. 9, a second member 34b positioned down in FIG. 9, and a third member 34c provided between the first member 34a and the second member 34b. The main body portion 34 has, formed therein, holder holes 341 that are through holes penetrating the first member 34a, second member 34b, and third member 34c and for accommodating plural probes 2. Positions at which the holder holes 341 are formed are determined according to an arrangement pattern of the probes 2.

The first member 34a to the third member 34c may be formed of the same material/materials or at least one of the first member 34a to the third member 34c may be formed of a material or materials different from that or those of the other/others. In an example described hereinafter for this second embodiment, the first member 34a and the second member 34b are formed of polyetherketone (PEEK) and the third member 34c is formed of polytetrafluoroethylene (PTFE). In terms of increasing the ability to hold the probes 2, the first member 34a and the second member 34b are preferably formed of a material having hardness. In terms of improving high frequency characteristics, the first member 34a to third member 34c are preferably formed of the same material having a low dielectric constant.

The first member 34a has plural counterbore portions 35 formed therein. The second member 34b has plural counterbore portions 36 formed therein. The counterbore portions 35 and 36 in the probe holder 3A illustrated in FIG. 9 are through holes penetrating the members, the numbers of the counterbore portions 35 and 36 formed therein are the same, and positions at which the counterbore portions 35 and 36 are formed are the same, the positions being relative to a holder hole 341. The counterbore portions 35 and 36 each have a bottomed hole shape having a bottom surface at a surface of the third member 34c.

Figure 10:
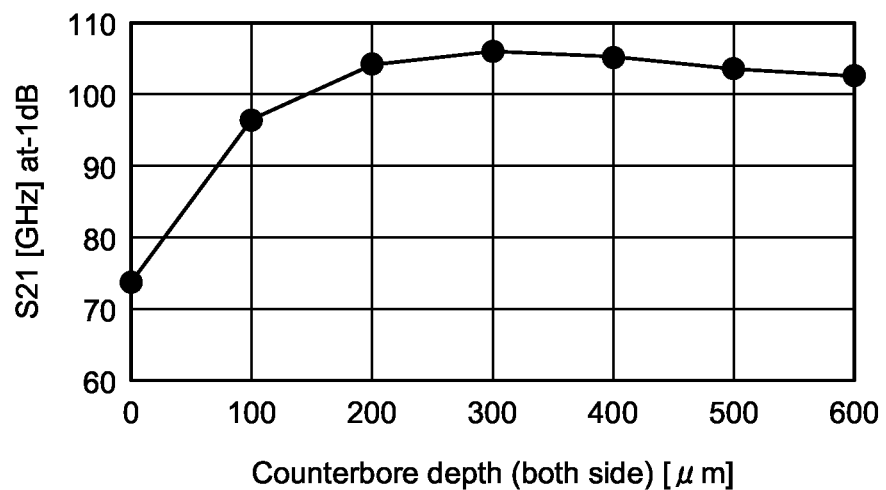
FIG. 10 is a diagram illustrating insertion loss (S21) in the probe unit according to the second embodiment of the present invention.

FIG. 10 is a diagram illustrating insertion loss (S21) in the probe unit according to the second embodiment of the present invention. For the probes 2 and counterbore portions 35 and 36 illustrated in FIG. 9, by changing the counterbore portion depth, an analysis of frequency at which S21 became −1 dB (insertion loss of +1 dB) was made. Signals transmitted by the probes 2 and arrangement of the probes 2 were the same as those for the arrangement illustrated in FIG. 4. Furthermore, this analysis was performed using Ansys HFSS manufactured by Anysys, Inc., with the pitch between the probes 2 being set to 0.4 mm, the thickness of the first member 34a and second member 34b being set to 0.30 mm, and the thickness of the third member 34c being set to 1.15 mm. In the analysis, depths of the counterbore portions 35 and 36 from outer surfaces of the main body portion 34 were set to the same depth.

As illustrated in FIG. 10, the larger the counterbore depth of the counterbore portions 35 and 36, the higher the frequency at which −1 dB is reached. In particular, the frequency in a case where the counterbore portions 35 and 36 are not provided (a depth of zero) is 73.7 GHz that is lower than those for configurations having the counterbore portions 35 and 36 formed therein. The frequency became the highest at a depth of 300 μm at which the counterbore portions 35 and 36 penetrate the first member 34a and second member 34b and have bottom surfaces at surfaces of the third member 34c. The frequency in a case where the counterbore portions 35 and 36 become continuous with each other to be formed into through holes penetrating the main body portion 34 was 100.0 GHz.

Furthermore, an analysis of frequency at which S21 became −1 dB (insertion loss of +1 dB) was performed by changing the numbers of counterbore portions formed and the positions where the counterbore portions were formed, with respect to a holder hole 341. Seven samples having modes of formation of counterbore portions were prepared, the modes being different from one another. Numbers (No. 1 to No. 7) were assigned to these samples and No. 1 had a configuration with no counterbore portions formed therein.

Configurations of Sample No. 2 to Sample No. 7 will hereinafter be described by reference to FIG. 11A to FIG. 11F. FIG. 11A to FIG. 11F are diagrams illustrating examples (Sample No. 2 to Sample No. 7) of a mode of formation of recessed portions in the probe unit according to the second embodiment of the present invention.

Figure 11A:
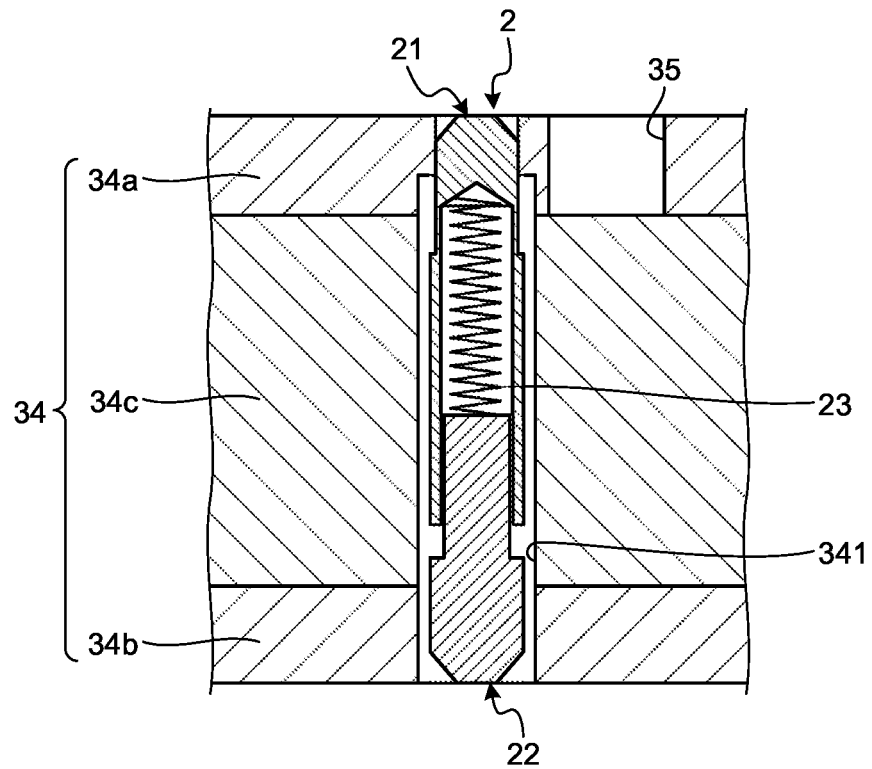
FIG. 11A is a diagram illustrating an example (Sample No. 2) of a mode of formation of a counterbore portion in the probe unit according to the second embodiment of the present invention.

Sample No. 2 has a counterbore portion 35 formed in a main body portion 34 (see FIG. 11A). Sample No. 2 has a configuration having one counterbore portion 35 formed near one end (near the first plunger 21) of a holder hole 341 in a cross section (hereinafter, simply referred to as a cross section of the main body portion 34) cut along a plane parallel to a penetrating direction of the holder hole 341, the plane including a central axis of the holder hole 341.

Figure 11B:
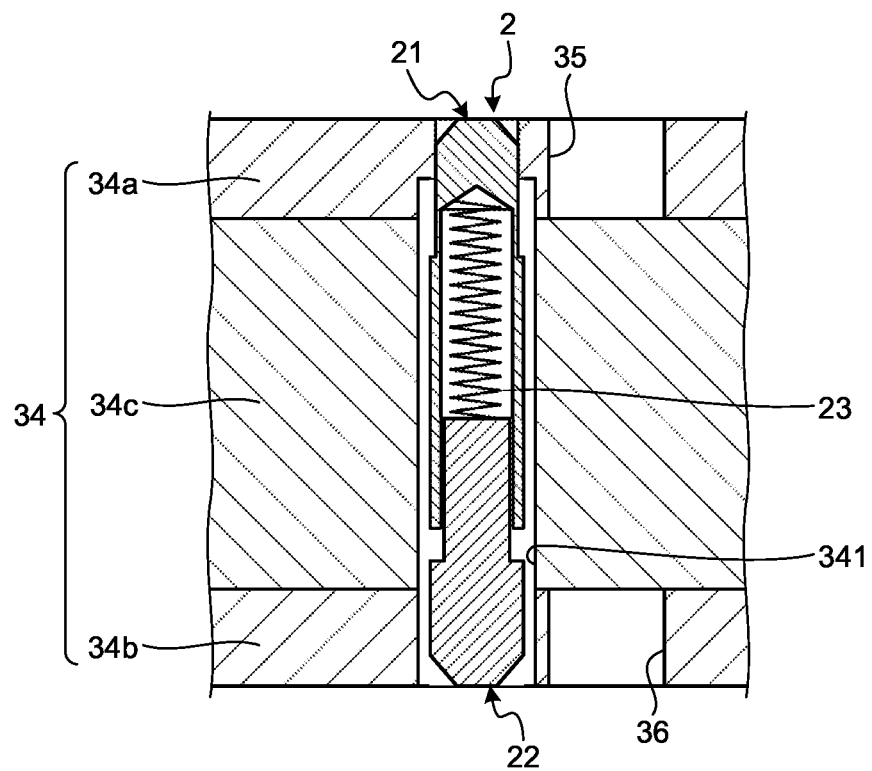
FIG. 11B is a diagram illustrating an example (Sample No. 3) of the mode of formation of the counterbore portion in the probe unit according to the second embodiment of the present invention.

Sample No. 3 has counterbore portions 35 and 36 each formed in a main body portion 34 (see FIG. 11B). Sample No. 3 has a configuration having one counterbore portion 35 and one counterbore portion 36 that are formed for a holder hole 341, in a cross section of the main body portion 34.

Figure 11C:
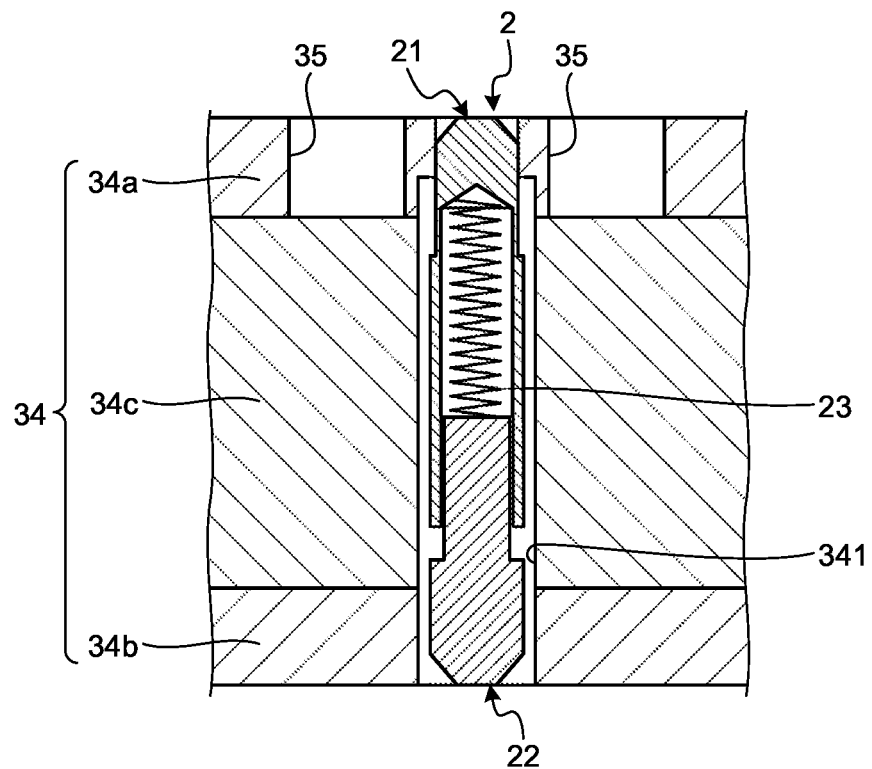
FIG. 11C is a diagram illustrating an example (Sample No. 4) of the mode of formation of the counterbore portion in the probe unit according to the second embodiment of the present invention.

Sample No. 4 has counterbore portions 35 formed in a main body portion 34 (see FIG. 11C). Sample No. 4 has a configuration having two counterbore portions 35 formed therein, with a holder hole 341 interposed between the two counterbore portions 36, in a cross section of the main body portion 34.

Figure 11D:
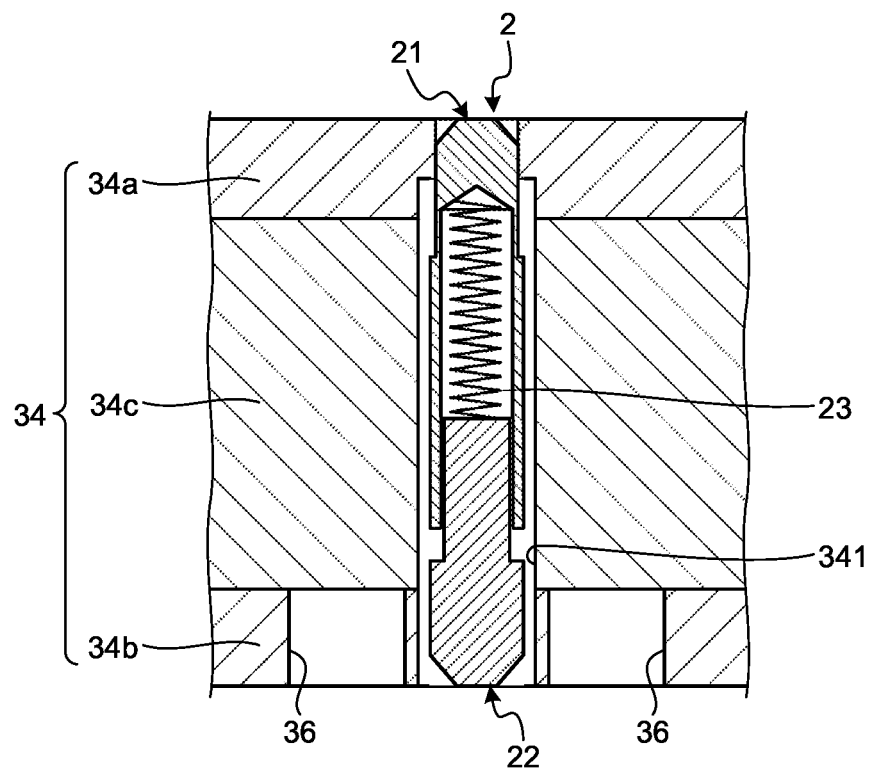
FIG. 11D is a diagram illustrating an example (Sample No. 5) of the mode of formation of the counterbore portion in the probe unit according to the second embodiment of the present invention.

Sample No. 5 has counterbore portions 36 formed in a main body portion 34 (see FIG. 11D). Sample No. 5 has two counterbore portions 36 formed near the second plunger 22, with a holder hole 341 interposed between the two counterbore portions 36, in a cross section of the main body portion 34.

Figure 11E:
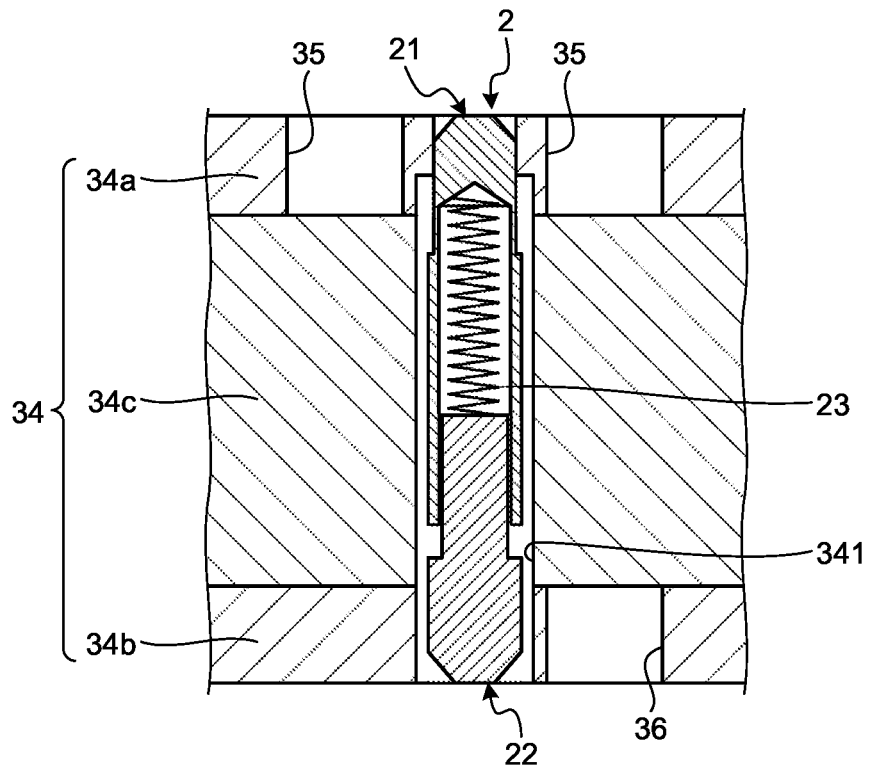
FIG. 11E is a diagram illustrating an example (Sample No. 6) of the mode of formation of the counterbore portion in the probe unit according to the second embodiment of the present invention.

Sample No. 6 has counterbore portions 35 and 36 each formed in a main body portion 34 (see FIG. 11E). Sample No. 6 has a configuration having one counterbore portion 36 formed near the second plunger 22 and two counterbore portions 35 formed near the first plunger 21, with a holder hole 341 interposed between the counterbore portions 36, in a cross section of the main body portion 34.

Figure 11F:
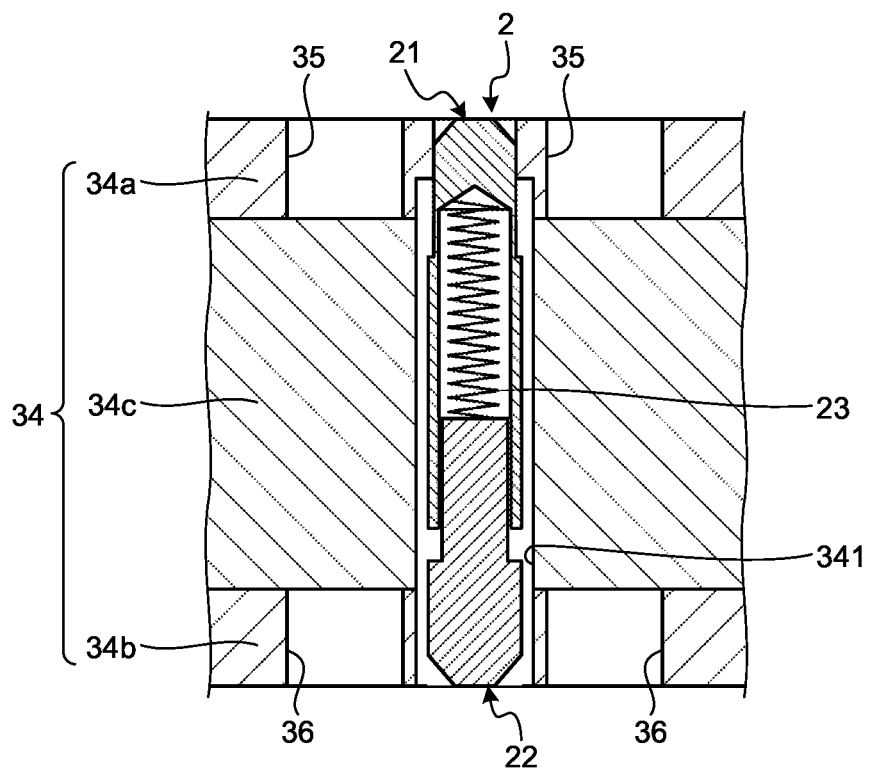
FIG. 11F is a diagram illustrating an example (Sample No. 7) of the mode of formation of the counterbore portion in the probe unit according to the second embodiment of the present invention.

Sample No. 7 has counterbore portions 35 and 36 each formed in a main body portion 34 (see FIG. 11F). Sample No. 7 has two counterbore portions 35 formed near the first plunger 21, with a holder hole 341 interposed between the two counterbore portions 35, and two counterbore portions 36 formed near the second plunger 22, with the holder hole 341 interposed between the two counterbore portions 36, in a cross section of the main body portion 34. This configuration is the same as the configuration illustrated in FIG. 9.

Figure 12:
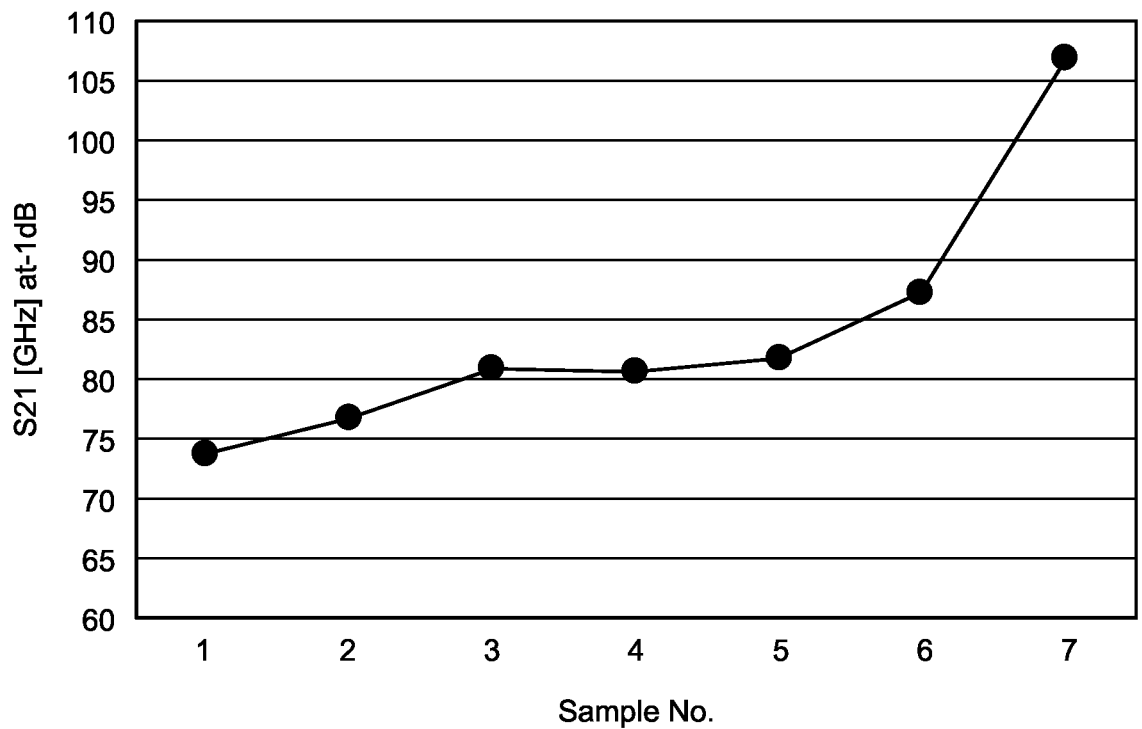
FIG. 12 is a diagram illustrating insertion loss (S21) in each sample.

FIG. 12 is a diagram illustrating insertion loss (S21) in each sample. The graph illustrated in FIG. 12 is a result of analysis of frequency at which S21 becomes −1 dB (insertion loss of +1 dB) when the counterbore portions have a depth of 300 μm in the samples. Furthermore, similarly to FIG. 10, this analysis was performed using Ansys HFSS manufactured by Anysys, Inc., with the pitch between probes 2 being set to 0.4 mm, the thickness of the counterbore portions 35 and 36 in the main body portions 34 being set to 1.75 mm, the thickness being in a depth direction. In the analysis, depths of the counterbore portions 35 and 36 from outer surfaces of the main body portions 34 were set to the same depth.

As illustrated in FIG. 12, the frequency at which −1 dB is reached changes depending on the mode of formation of the counterbore portions 35 and 36. In particular, forming at least one counterbore portion in Sample No. 1 not provided with any counterbore portion 35 or 36 increases the frequency. Furthermore, the configurations (Sample No. 3 to Sample No. 5) each having two counterbore portions formed for a holder hole 341 are higher in the frequency than Sample No. 2 having one counterbore portion formed therein. Similarly, the configuration (Sample No. 6) having three counterbore portions for a holder hole 341 is higher in the frequency than Sample No. 1 to Sample No. 5, and the configuration (Sample No. 7) having four counterbore portions formed therein is higher in the frequency than Sample No. 6. It can thereby be said that forming the counterbore portions enables increase in the frequency at which −1 dB is reached and increasing the number of counterbore portions formed enables further increase in the frequency. In particular, the configurations (No. 6 and No. 7) provided with three or more counterbore portions enable increases of 10 GHz or more from that for the configuration (No. 1) not provided with a counterbore portion.

Figure 13:
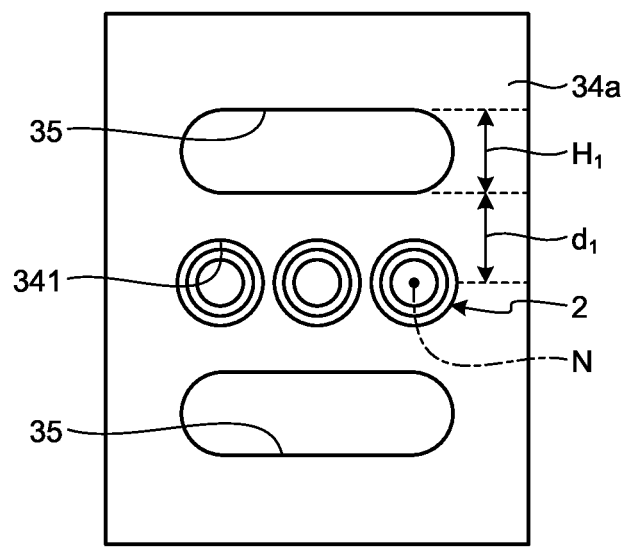
FIG. 13 is a diagram illustrating an example (No. 1) of a mode of formation of counterbore portions and holder holes (contact probes) in the probe unit according to the second embodiment of the present invention.
Figure 14:
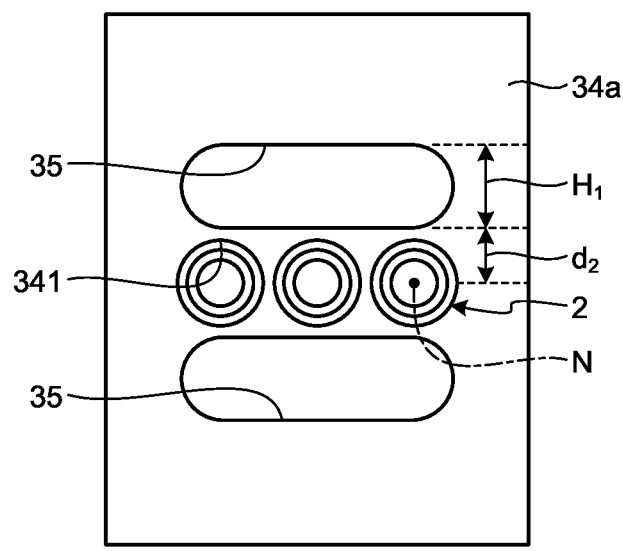
FIG. 14 is a diagram illustrating an example (No. 2) of the mode of formation of the counterbore portions and holder holes (contact probes) in the probe unit according to the second embodiment of the present invention.
Figure 15:
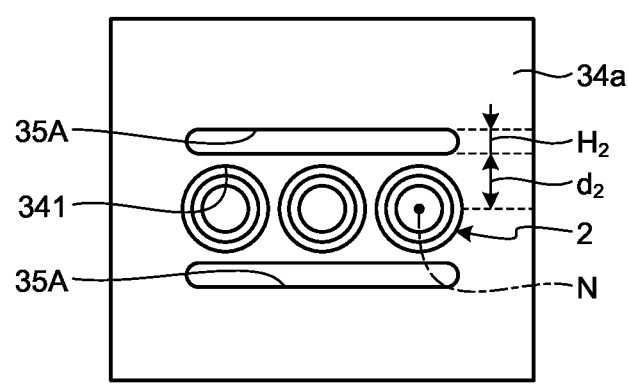
FIG. 15 is a diagram illustrating an example (No. 3) of the mode of formation of the counterbore portions and holder holes (contact probes) in the probe unit according to the second embodiment of the present invention.

Furthermore, the above described analysis was performed with the distance changed, the distance being between the holder hole 341 and the counterbore portions 35, 35A. FIG. 13 to FIG. 15 are diagrams each illustrating an example of a mode of formation of counterbore portions and holder holes (contact probes) in the probe unit according to the second embodiment of the present invention. Positions at which counterbore portions 35 are formed or sizes of the counterbore portions 35 in first members 34a illustrated in FIG. 13 to FIG. 15 are different from each other. Specifically, in the first member 34a illustrated in FIG. 13, a distance between an axis N of a holder hole 341 and an edge of a counterbore portion 35 is $d_1$, the edge being near the holder hole 341, and in each of the first members 34a illustrated in FIG. 14 and FIG. 15, a distance between an axis N of a holder hole 341 and an edge of a counterbore portion 35 is $d_2$ ($<d_1$), the edge being near the holder hole 341. Furthermore, in each of the first members 34a illustrated in FIG. 13 and FIG. 14, a width of the counterbore portion 35 is $H_1$, and in the first member 34a illustrated in FIG. 15, a width of the counterbore portion 35A is $H_2$ ($>H_1$). As a result of analysis, it can be said that the closer the distance to the holder hole 341 and the larger the width, the higher the frequency at which −1 dB is reached, with the frequency for the configuration illustrated in FIG. 13 being 84.4 GHz, the frequency for the configuration illustrated in FIG. 14 being 106.7 GHZ, and the frequency for the configuration illustrated in FIG. 15 being 81.9 GHZ.

In the above described second embodiment, providing the counterbore portions 35 and 36 around the probes 2 in the probe holder 3A enables reduction in insertion loss at higher frequency. The second embodiment enables minimization of damping of high frequency signals by formation of the counterbore portions 35 and 36.

Furthermore, in the second embodiment described above, increasing the number of counterbore portions formed, increasing the width of the counterbore portions, and providing the counterbore portions closer to the holder holes enable increase in the frequency at which −1 dB is reached and further reduction of damping of high frequency signals.

The example in which the probe holder 3A is formed of a three layer structure of the first member 34a to the third member 34c has been described with respect to the second embodiment, but the probe holder 3A may be formed of plural layers, for example, two layers or four or more layers, or may be configured to have a space formed in part of the probe holder 3A.

First Modified Example of Second Embodiment

Figure 16:
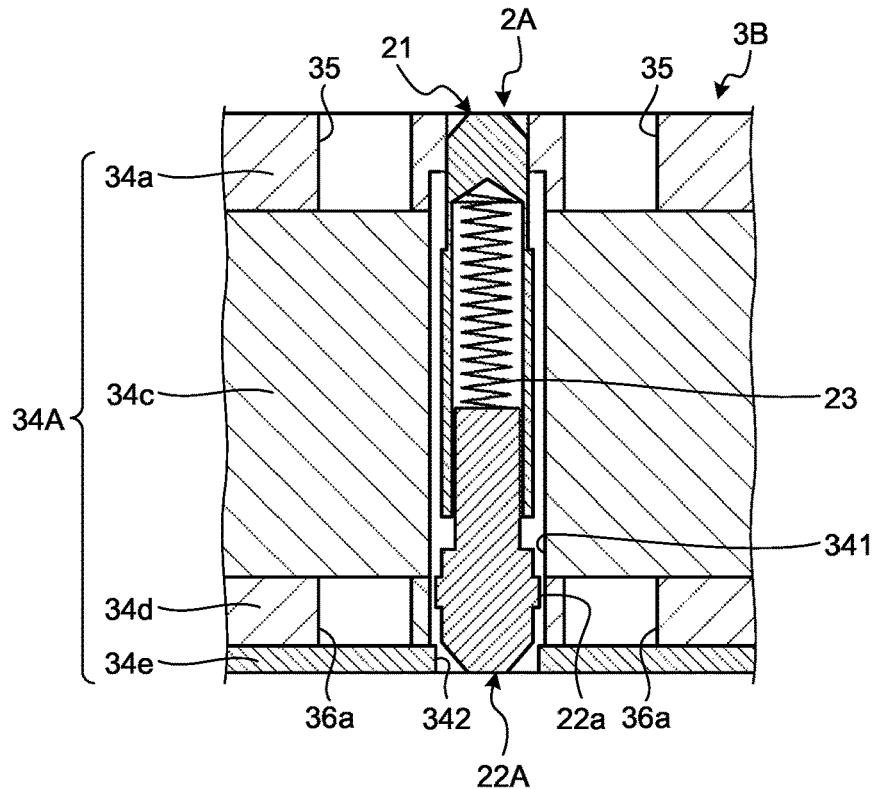
FIG. 16 is a sectional view illustrating a configuration of main parts of a probe unit according to a first modified example of the second embodiment of the present invention.

A first modified example of the second embodiment of the present invention will be described next. FIG. 16 is a sectional view illustrating a configuration of main parts of a probe unit according to the first modified example of the second embodiment of the present invention. The probe unit according to the first modified example includes probes 2A instead of the probes 2 of the probe unit 1 described above, and a probe holder 3B instead of the probe holder 3. Components other than the probes 2A and the probe holder 3B are similar to those of the first embodiment and description thereof will thus be omitted.

The probes 2A each include a first plunger 21, a second plunger 22A, and a coil spring 23. The probe 2A has the same configuration as the probe 2 except for a flange portion 22a formed on a side surface of the second plunger 22A.

The probe holder 3B includes a main body portion 34A formed using an insulating material, such as resin, machinable ceramic, or silicon. The main body portion 34A is a multilayer having plural members layered over one another, the plural members being formed using insulating materials different from each other. The main body portion 34A has a first member 34a, a second member 34d, a third member 34c, and a fourth member 34e that are plate-like. The first member 34a is positioned up in FIG. 16. The fourth member 34e is positioned down in FIG. 16. The second member 34d and the third member 34c are provided between the first member 34a and the fourth member 34e. The main body portion 34A corresponds to a configuration having the fourth member 34e layered over the second member 34b of the main body portion 34 according to the second embodiment. The main body portion 34A has, formed therein, holder holes 341 that are through holes penetrating the first member 34a, second member 34d, and third member 34c and that are for accommodating plural probes 2A. The holder holes 341 correspond to first holder holes that each form a space having a stepped shape having a narrower end portion near the first member.

Similarly to the second embodiment, the first member 34a to the fourth member 34e may be formed of the same material/materials or at least one of the first member 34a to the fourth member 34e may be formed of a material or materials different from that or those of the other/others. Furthermore, an example in which the sum of thicknesses of the second member 34d and the fourth member 34e is equal to a thickness of the second member 34b of the second embodiment is described herein but the thickness relation is not limited to this example.

The second member 34d has plural counterbore portions 36a formed therein. The counterbore portions 36a are through holes penetrating the member, the number of counterbore portions 36a formed is the same as the number of counterbore portions 35 formed, and positions at which the counterbore portions 35 and 36a are formed are the same, the positions being relative to a holder hole 341. The counterbore portions 36a each have a bottomed hole shape having bottom surfaces at surfaces of the third member 34c and the fourth member 34e. This hole shape forms a closed space closed by the third member 34c and the fourth member 34e.

The fourth member 34e has a through hole 342 penetrating the fourth member 34e in a plate thickness direction. The through hole 342 is provided correspondingly to the holder hole 341 and an opening of the through hole 342 has a size smaller than that of the holder hole. A diameter of the through hole 342 is smaller than a diameter of the holder hole 341, the diameters being in a direction orthogonal to a penetrating direction. In a case where a cross section of the through hole has a shape other than a circle, the cross section being orthogonal to the penetrating direction, the "diameter" mentioned above corresponds to a side or a diagonal line of the shape of the cross section, or a diameter of a circumscribed circle of the shape.

The flange portion 22a of the probe 2A is caught by a stepped portion formed by the holder hole 341 and through hole 342, and the probe 2A is thereby prevented from coming off from the fourth member 34e.

In the above described first modified example, providing the counterbore portions 35 and 36a around the probe 2A in the probe holder 3B enables reduction of insertion loss at higher frequency. The first modified example enables minimization of damping of high frequency signals by formation of the counterbore portions 35 and 36a.

Furthermore, in the above described first modified example, the probes 2A are able to be prevented from falling off more infallibly because the fourth member 34e having the through holes 342 formed therein is provided and the flange portions 22a provided in the probes 2A are caught by the fourth member 34e, the through holes 342 each closing part of a holder hole 341 in the second member 34d.

Second Modified Example of Second Embodiment

Figure 17:
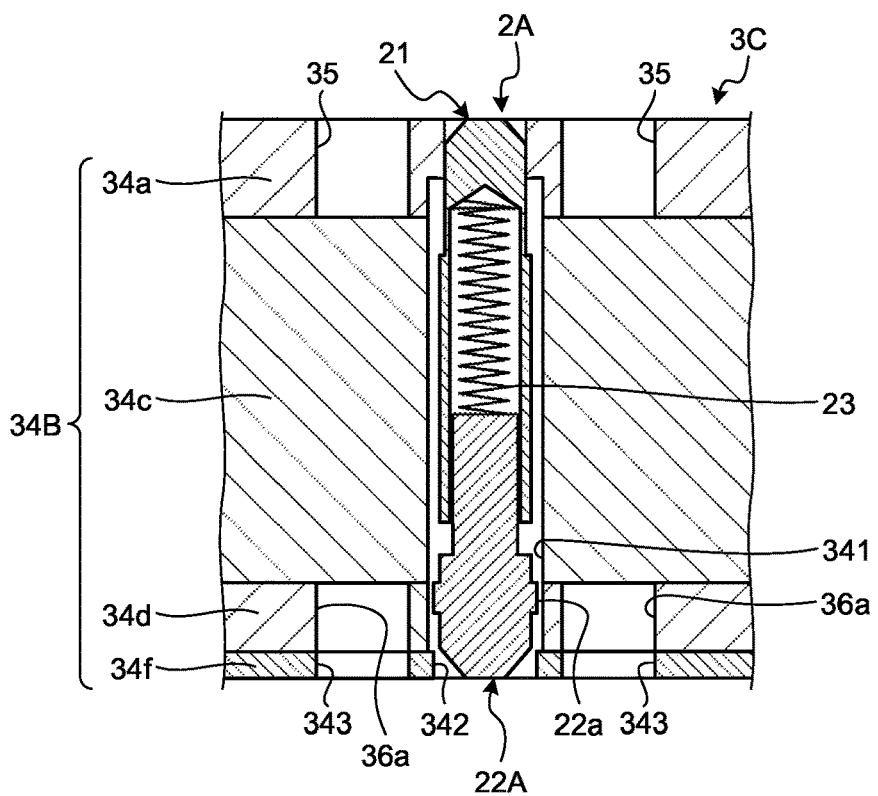
FIG. 17 is a sectional view illustrating a configuration of main parts of a probe unit according to a second modified example of the second embodiment of the present invention.

A second modified example of the second embodiment of the present invention will be described next. FIG. 17 is a sectional view illustrating a configuration of main parts of a probe unit according to the second modified example of the second embodiment of the present invention. The probe unit according to the second modified example includes probes 2A instead of the probes 2 of the probe unit 1 described above, and a probe holder 3C instead of the probe holder 3. Components other than the probe holder 3C are similar to those of the first embodiment and the first modified example and description thereof will thus be omitted.

The probe holder 3C includes a main body portion 34B formed using an insulating material, such as resin, machinable ceramic, or silicon. The main body portion 34 is a multilayer having plural members layered over one another, the plural members being formed using insulating materials different from each other. The main body portion 34B has a first member 34a, a second member 34d, a third member 34c, and a fourth member 34f that are plate-like. The first member 34a is positioned up in FIG. 17. The fourth member 34f is positioned down in FIG. 17. The second member 34d and the third member 34c are provided between the first member 34a and the fourth member 34f. The main body portion 34B corresponds to a configuration having the fourth member 34f layered over the second member 34b of the main body portion 34 according to the second embodiment.

Similarly to the first modified example of the second embodiment, the first member 34a to the fourth member 34f may be formed of the same material/materials or at least one of the first member 34a to the fourth member 34f may be formed of a material or materials different from that or those of the other/others. Furthermore, an example in which the sum of thicknesses of the second member 34d and the fourth member 34f is equal to the thickness of the second member 34b of the second embodiment is described herein but the thickness relation is not limited to this example.

The second member 34d has plural counterbore portions 36a formed therein. The counterbore portions 36a each have a bottomed hole shape having a bottom surface at a surface of the third member 34c.

The fourth member 34f has through holes 342 and 343 penetrating the fourth member 34f in a plate thickness direction. The through hole 342 is provided correspondingly to a holder hole 341 and an opening of the through hole 342 has a size smaller than that of the holder hole. Furthermore, the through holes 343 are provided correspondingly to the counterbore portions 36a and each have an opening having the same size as openings of the counterbore portions 36a. That is, the counterbore portions 36a and the through holes 343 form spaces each extending while maintaining the same shape. In other words, in a case where the counterbore portions 36a each form an extending hole shape having a circular shape, the through holes 343 each similarly extend to form a hole shape having a circular shape, and in a case where the counterbore portions 36a each form an extending hole shape having a long hole shape, the through holes 343 each similarly form an extending hole shape having a long hole shape.

In the above described second modified example, providing the counterbore portions 35 and 36a around the probe 2A and providing the through holes 343 in the fourth member 34f in the probe holder 3C enable reduction of insertion loss at higher frequency. The second modified example enables minimization of damping of high frequency signals by formation of the counterbore portions 35 and 36a and through holes 343.

Furthermore, in the above described second modified example, the probes 2A are able to be prevented from falling off more infallibly because the fourth member 34f having the through holes 342 formed therein is provided and the flange portions 22a provided in the probes 2A are caught by the fourth member 34f, the through holes 342 each closing part of a holder hole 341 in the second member 34d.

Third Modified Example of Second Embodiment

Figure 18:
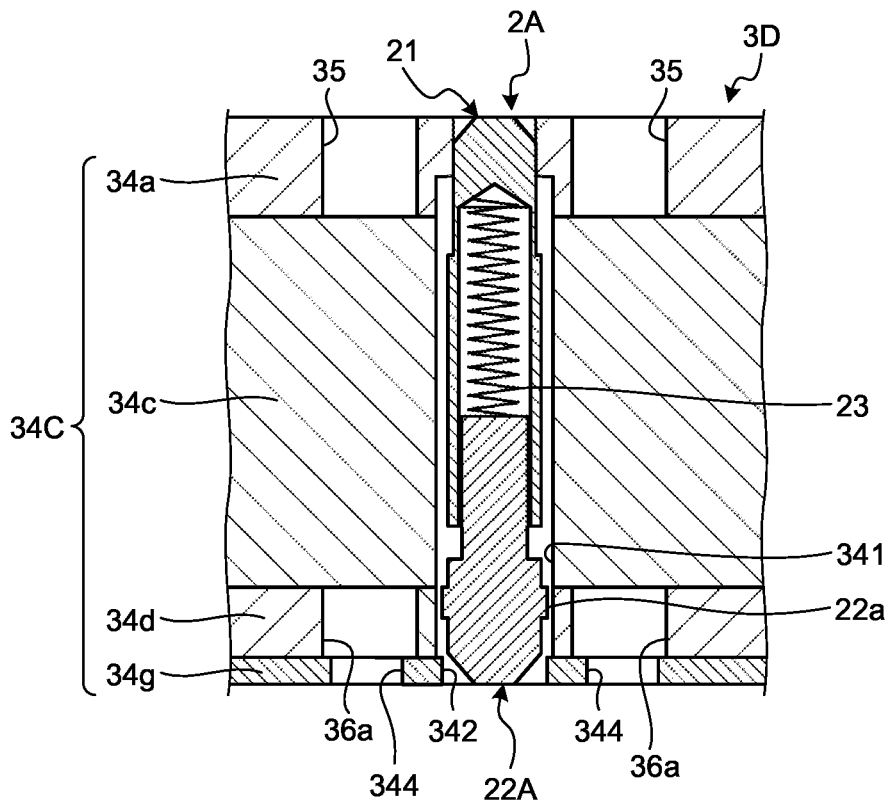
FIG. 18 is a sectional view illustrating a configuration of main parts of a probe unit according to a third modified example of the second embodiment of the present invention.

A third modified example of the second embodiment of the present invention will be described next. FIG. 18 is a sectional view illustrating a configuration of main parts of a probe unit according to the third modified example of the second embodiment of the present invention. The probe unit according to the third modified example includes probes 2A instead of the probes 2 of the probe unit 1 described above, and a probe holder 3D instead of the probe holder 3. Components other than the probe holder 3D are similar to those of the first embodiment and the first modified example and description thereof will thus be omitted.

The probe holder 3D includes a main body portion 34C formed using an insulating material, such as resin, machinable ceramic, or silicon. The main body portion 34C is a multilayer having plural members layered over one another, the plural members being formed using insulating materials different from each other. The main body portion 34C has a first member 34a, a second member 34d, a third member 34c, and a fourth member 34g that are plate-like. The first member 34a is positioned up in FIG. 18. The fourth member 34g is positioned down in FIG. 18. The second member 34d and the third member 34c are provided between the first member 34a and the fourth member 34g. The main body portion 34C corresponds to a configuration having the fourth member 34g layered over the second member 34b of the main body portion 34 according to the second embodiment.

Similarly to the first modified example of the second embodiment, the first member 34a to the fourth member 34g may be formed of the same material/materials or at least one of the first member 34a to the fourth member 34g may be formed of a material or materials different from that or those of the other/others. Furthermore, an example in which the sum of thicknesses of the second member 34d and the fourth member 34g is equal to the thickness of the second member 34b of the second embodiment is described herein but the thickness relation is not limited to this example.

The second member 34d has plural counterbore portions 36a formed therein. The counterbore portions 36a each have a bottomed hole shape having a bottom surface at a surface of the third member 34c.

The fourth member 34g has through holes 342 and 344 penetrating the fourth member 34g in a plate thickness direction. The through hole 342 is provided correspondingly to a holder hole 341 and an opening of the through hole 342 has a size smaller than that of the holder hole. Furthermore, the through holes 344 are provided correspondingly to the counterbore portions 36a and each have an opening having a size smaller than that of openings of the counterbore portions 36a. That is, the counterbore portions 36a and the through holes 344 form spaces each having a stepped shape. In a case where shapes of openings of the counterbore portions 36a and the through holes 344 are similar figures and the counterbore portions 36a each form an extending hole shape having a circular shape, the through holes 344 each similarly extend to form a hole shape having a circular shape, and in a case where the counterbore portions 36a each form an extending hole shape having a long hole shape, the through holes 344 each form an extending hole shape having a similar long hole shape.

In the above described third modified example, providing counterbore portions 35 and 36a around the probes 2A in the probe holder 3D enables reduction of insertion loss at higher frequency. The third modified example enables minimization of damping of high frequency signals by formation of the counterbore portions 35 and 36a and through holes 344.

Furthermore, in the above described third modified example, the probes 2A are able to be prevented from falling off more infallibly because the fourth member 34g having the through holes 342 formed therein is provided and flange portions 22a provided in the probes 2A are caught by the fourth member 34g, the through holes 342 each closing part of a holder hole 341 in the second member 34d.

Fourth Modified Example of Second Embodiment

Figure 19:
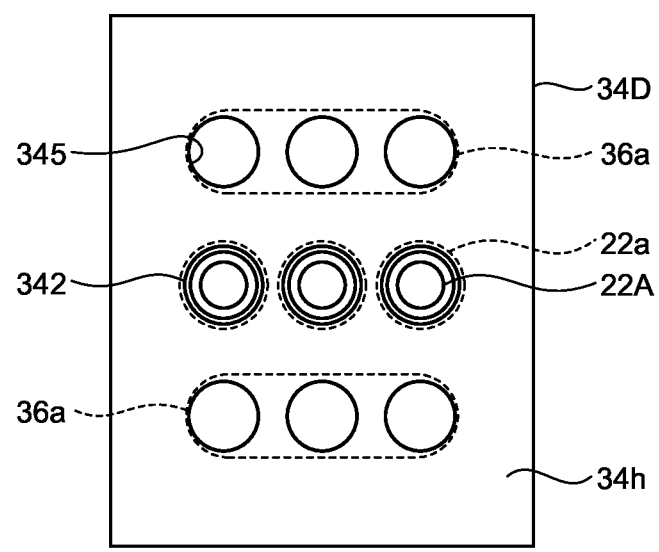
FIG. 19 is a diagram illustrating an example of a mode of formation of counterbore portions and through holes in a probe unit according to a fourth modified example of the second embodiment of the present invention.

A fourth modified example of the second embodiment of the present invention will be described next. FIG. 19 is a diagram illustrating an example of a mode of formation of counterbore portions and through holes in a probe unit according to the fourth modified example of the second embodiment of the present invention. The probe unit according to the fourth modified example includes a main body portion 34D instead of the main body portion 34A according to the first modified example of the second embodiment. Components other than the main body portion 34D are similar to those of the first embodiment and the first modified example and description thereof will thus be omitted.

The main body portion 34D is formed using an insulating material, such as resin, machinable ceramic, or silicon. The main body portion 34D is a multilayer having plural members layered over one another, the plural members being formed using insulating materials different from each other. The main body portion 34D has a first member 34a, a second member 34d, a third member 34c (see FIG. 16, for example), and a fourth member 34h that are plate-like.

The fourth member 34h has through holes 342 and 345 penetrating the fourth member 34h in a plate thickness direction. Plural through holes 345 are provided correspondingly to counterbore portions 36a. The through holes 345 are provided, for example, in regions where the counterbore portions 36a are formed and at positions between which probes 2A are interposed.

In the fourth modified example described above, providing counterbore portions 35 and 36a around probes 2A in the probe holder and providing through holes 345 in the fourth member 34h enable reduction of insertion loss at higher frequency. The fourth modified example enables minimization of damping of high frequency signals by formation of the counterbore portions 35 and 36a and through holes 345.

The fourth members 34e to 34h each functioning as a lid of the holder holes 341 for the third member 34c are applicable to the first embodiment. For example, in the configuration illustrated in FIG. 2, replacing the probes 2 with probes 2A and providing a fourth member near the counterbore portions 33b enable the probes 2A to be prevented from coming off.

Third Embodiment

Figure 20:
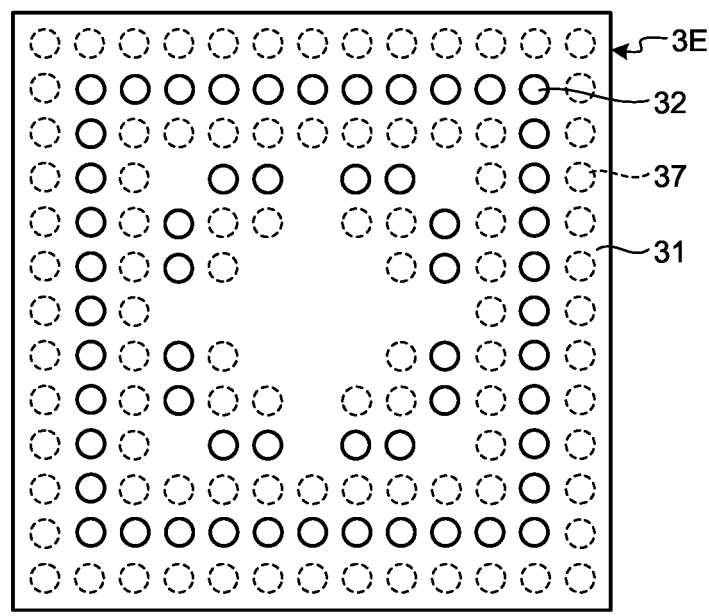
FIG. 20 is a plan view illustrating a configuration of a probe holder included in a probe unit according to a third embodiment of the present invention.

A third embodiment of the present invention will be described next. FIG. 20 is a plan view illustrating a configuration of a probe holder included in a probe unit according to the third embodiment of the present invention. The probe unit according to the third embodiment includes a probe holder 3E instead of the probe holder 3 of the probe unit 1 described above. Components other than the probe holder 3E are similar to those of the first embodiment and description thereof will thus be omitted.

The probe holder 3E includes a main body portion 31 formed using an insulating material, such as resin, machinable ceramic, or silicon. The probe holder 3E has, formed therein: holder holes 32 for accommodating plural probes 2; and counterbore portions provided around the holder holes 32 and each having a groove shape. FIG. 20 illustrates only one set of counterbore portions 37 formed in the main body portion 31. Furthermore, FIG. 20 illustrates the counterbore portions 37 by using broken lines to distinguish between the holder holes 32 and the counterbore portions 37. The counterbore portions 37 each have a circular opening with a size similar to that of openings of the holder holes 32. The counterbore portions 37 are formed around the holder holes 32.

In the third embodiment described above also, providing the counterbore portions 37 around the probes 2 enables reduction in insertion loss at higher frequency.

Fourth Embodiment

Figure 21:
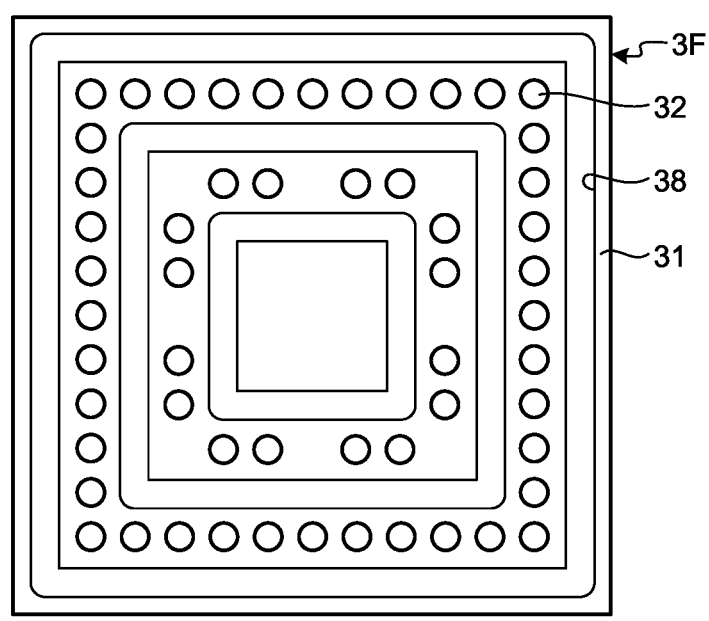
FIG. 21 is a plan view illustrating a configuration of a probe holder included in a probe unit according to a fourth embodiment of the present invention.

A fourth embodiment of the present invention will be described next. FIG. 21 is a plan view illustrating a configuration of a probe holder included in a probe unit according to the fourth embodiment of the present invention. The probe unit according to the fourth embodiment includes a probe holder 3F instead of the probe holder 3 of the probe unit 1 described above. Components other than the probe holder 3F are the similar to those of the first embodiment and description thereof will thus be omitted.

The probe holder 3F includes a main body portion 31 formed using an insulating material, such as resin, machinable ceramic, or silicon. The probe holder 3F has, formed therein: holder holes 32 for accommodating plural probes 2; and counterbore portions provided around the holder holes 32 and each having a groove shape. FIG. 21 illustrates only one set of counterbore portions 38 formed in the main body portion 31. The counterbore portions 38 are each a loop shaped groove extending along plural holder holes 32.

In the fourth embodiment described above also, providing the counterbore portions 38 around the probes 2 enables reduction in insertion loss at higher frequency.

Fifth Embodiment

Figure 22:
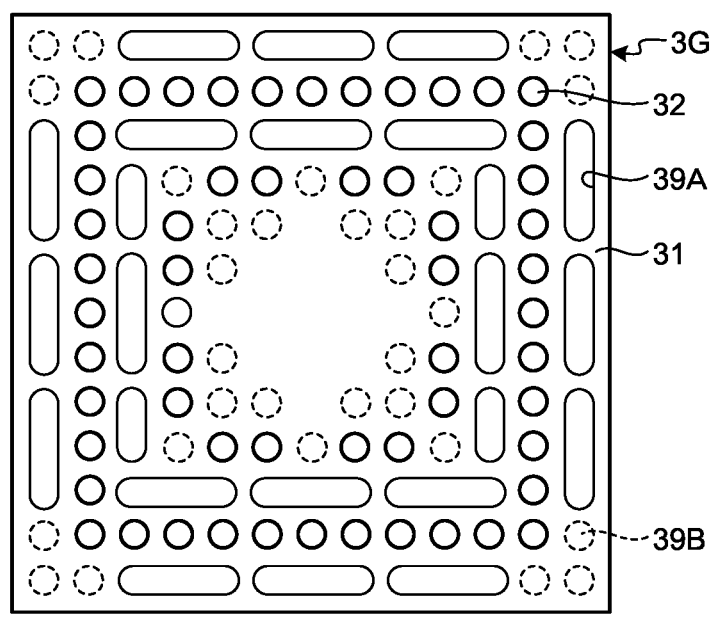
FIG. 22 is a plan view illustrating a configuration of a probe holder included in a probe unit according to a fifth embodiment of the present invention.

A fifth embodiment of the present invention will be described next. FIG. 22 is a plan view illustrating a configuration of a probe holder included in a probe unit according to the fifth embodiment of the present invention. The probe unit according to the fifth embodiment includes a probe holder 3G instead of the probe holder 3 of the probe unit 1 described above. Components other than the probe holder 3G are similar to those of the first embodiment and description thereof will thus be omitted.

The probe holder 3G includes a main body portion 31 formed using an insulating material, such as resin, machinable ceramic, or silicon. The probe holder 3G has, formed therein: holder holes 32 for accommodating plural probes 2; and counterbore portions provided around the holder holes 32 and each having a groove shape. FIG. 22 illustrates only one set of counterbore portions 39A and 39B formed in the main body portion 31. Furthermore, FIG. 22 illustrates the counterbore portions 39B by using broken lines to distinguish between the holder holes 32 and the counterbore portions 39B. The counterbore portions 39A each have a long hole shape extending along plural holder holes 32. The counterbore portions 39B each have a circular opening with a size similar to that of openings of the holder holes 32.

In the fifth embodiment described above also, providing the counterbore portion 39A and 39B around the probes 2 enables reduction in insertion loss at higher frequency.

Sixth Embodiment

Figure 23:
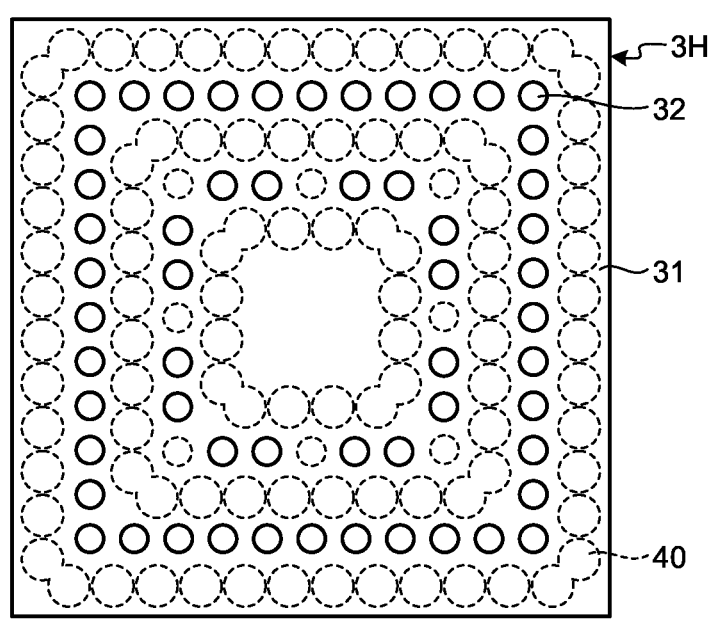
FIG. 23 is a plan view illustrating a configuration of a probe holder included in a probe unit according to a sixth embodiment of the present invention.

A sixth embodiment of the present invention will be described next. FIG. 23 is a plan view illustrating a configuration of a probe holder included in a probe unit according to the sixth embodiment of the present invention. The probe unit according to the sixth embodiment includes a probe holder 3H instead of the probe holder 3 of the probe unit 1 described above. Components other than the probe holder 3H are similar to those of the first embodiment and description thereof will thus be omitted.

The probe holder 3H includes a main body portion 31 formed using an insulating material, such as resin, machinable ceramic, or silicon. The probe holder 3H has, formed therein: holder holes 32 for accommodating plural probes 2; and counterbore portions provided around the holder holes 32 and forming a groove shape. FIG. 23 illustrates only one set of counterbore portions 40 formed in the main body portion 31. Furthermore, FIG. 23 illustrates the counterbore portions 40 by using broken lines to distinguish between the holder holes 32 and the counterbore portions 40. The counterbore portions 40 each have a circular opening having a size similar to that of openings of the holder holes 32. Some of the plural counterbore portions 40 are connected with each other.

In the sixth embodiment described above also, providing the counterbore portions 40 around the probes 2 enables reduction in insertion loss at higher frequency.

The present invention may thus include various embodiments not described herein, and various design changes, for example, may be made without departing from the technical ideas determined by the claims.

Examples in which openings of the counterbore portions each have an oval or circular shape have been described with respect to the first to sixth embodiments, but the counterbore portions may each have another shape, such as a shape of a character, a polygonal shape, or a star shape. Making the shape of the openings unique enables visibility of the counterbore portions to be improved and arrangement of the probes 2 to be checked readily.

Furthermore, the configurations of the contact probes described herein are just examples, and various types of probes conventionally known may be used. For example, without being limited to the above described configuration having plungers and a coil spring, probes to be used may each be: a probe including a pipe member; a pogo pin; an electrically conductive solid member; an electrically conductive pipe; a wire; or a connecting terminal (a connector) that connects electric contact points together, or any combination of these different types of probes may be combined together as appropriate.

INDUSTRIAL APPLICABILITY

As described above, a probe unit according to the present invention is suitable for minimization of damping of high frequency signals.

REFERENCE SIGNS LIST

1 PROBE UNIT
2 CONTACT PROBE (PROBE)
3, 3A TO 3H PROBE HOLDER
21 FIRST PLUNGER
22 SECOND PLUNGER
23 COIL SPRING
31, 34 MAIN BODY PORTION
32, 341 HOLDER HOLE
33, 33a, 33b, 35, 36, 36a, 37, 38, 39A, 39B COUNTERBORE PORTION
34a FIRST MEMBER
34b, 34d SECOND MEMBER
34c THIRD MEMBER
34e TO 34h FOURTH MEMBER
100 SEMICONDUCTOR INTEGRATED CIRCUIT
200 CIRCUIT BOARD

The invention claimed is:

1. A probe unit comprising:
a contact probe that comes into contact with, at both ends of a longitudinal length of the contact probe, each of electrodes that are contact targets; and
a probe holder including a main body portion configured to hold the contact probe, the main body portion being insulating, wherein
the main body portion includes, formed therein:
a holder hole configured to hold the contact probe inserted in the holder hole; and
a counterbore portion drilled in at least part of an area around the holder hole, the area being on one of surfaces of the main body portion, the surfaces being near one end and another end of the contact probe, the counterbore portion having an inner wall surface that forms a hollow space and that is insulating.

2. The probe unit according to claim 1, wherein one or more counterbore portions that are same as the counterbore portion are provided around the holder hole for the holder hole.

3. The probe unit according to claim 1, wherein the main body portion is a single layer.

4. The probe unit according to claim 1, wherein the main body portion includes plural members layered over one another and at least one of the plural members is a single layer formed of a different insulating material.

5. The probe unit according to claim 4, wherein the main body portion includes, layered over one another:
a first member formed of an insulating material;
a second member formed of same insulating material as the first member; and
a third member provided between the first member and the second member and formed of an insulating material different from that of the first member and the second member.

6. The probe unit according to claim 5, wherein the counterbore portion includes:
a first counterbore portion provided in the first member, penetrating the first member, and having a bottom surface at a surface of the third member; and
a second counterbore portion provided in the second member, penetrating the second member, and having a bottom surface at a surface of the third member.

7. The probe unit according to claim 5, wherein
the main body portion further includes a fourth member provided on one side of the second member, the one side being opposite to a side where the third member is, and the holder hole includes:
- a first holder hole penetrating the first to third members and forming a stepped space having a narrower end portion near the first member; and
- a second holder hole penetrating the fourth member and being a through hole having an opening with a diameter smaller than a diameter of the first holder hole.

8. The probe unit according to claim 1, wherein the counterbore portion has a bottomed hole shape.

9. The probe unit according to claim 1, wherein the counterbore portion is a through hole penetrating the main body portion.

10. The probe unit according to claim 1, wherein the contact probe includes:
- a first plunger that forms a bottomed hollow space and comes into contact with one of the contact targets;
- a second plunger that forms a bottomed hollow space and comes into contact with the other one of the contact targets; and
- a coil spring that biases the first and second plungers, the hollow spaces of the first and second plungers are coupled to each other and the first and second plungers are thereby connected with each other, and the coil spring is positioned in a hollow space formed by the first and second plunger.

11. The probe unit according to claim 1, wherein the probe holder holds a first contact probe to be connected to an electrode for a signal and a second contact probe to be connected to an electrode for grounding, and in arrangement of the contact probe in the probe holder, at least one second contact probe that is same as the second contact probe is arranged around the first contact probe.

* * * * *